3,149,122
RESOLUTION OF AMMONIUM N-ACYL-DL-TRYPTOPHANATES
Ichiro Sasaji, Kawasaki-shi, Kanagawa-ken, and Ko Ohno and Jiro Kato, Tokyo, Japan, assignors to Ajinomoto Kabushiki Kaisha, Tokyo, Japan, a corporation of Japan
No Drawing. Filed Sept. 22, 1961, Ser. No. 139,849
5 Claims. (Cl. 260—319)

This invention relates to a new process for resolving optically inactive N-acyl-DL-tryptophan into optically active N-acyl-D- and L-tryptophans.

L-tryptophan is one of the essential amino acids, which, however, cannot be produced by hydrolyzing natural proteins because usual acid hydrolysis causes decomposition of said amino acid. Enzymatic hydrolysis used for this purpose is rather troublesome.

Several synthetic methods for producing tryptophan are known, but they give tryptophan in its racemic or DL-form, which is a mixture in equal proportions of the L- and D-isomers. L-tryptophan is biologically or nutritionally active in human diets, whereas D-tryptophan is not. Various methods have been proposed for resolving racemic tryptophan, generally in the form of N-acyl derivatives. By the use of suitable resolution and racemization methods, synthetic DL-tryptophan can be converted substantially into optically active N-acyl-L-tryptophan. This compound can be converted to L-tryptophan by known methods.

Two kinds of methods were employed for resolving N-acyl-DL-tryptophan, namely chemical methods and biochemical or enzymatic methods.

The principle of the chemical methods is to produce diastereomers from a racemic substance by reacting it with optically active compounds called resolving reagents and to separate one diastereomer from the other by the difference of their solubilities. The methods proposed for resolving N-acyl-DL-tryptophan involve the use, for example, of brucine, quinine, L-lysine, or (+)-α-phenethylamine, as the resolving reagent. Such methods are generally not very practical because of the relatively high cost of such resolving reagent.

The biochemical or enzymatic methods, of which the principle is to hydrolyze specifically one of the said DL-isomers, viz. N-acyl-L-tryptophan by hog kidney acylase or mold acylase and to separate the resulting L-tryptophan from N-acyl-D-tryptophan unchanged, are also not very practical because said enzymes are not usable repeatedly and therefore must be prepared freshly.

It is one object of the present invention to provide a simple, effective, and inexpensive method of resolving N-acyl-DL-tryptophan and to produce the valuable N-acyl-L-tryptophan and furthermore L-tryptophan by hydrolysis therefrom.

The process according to the present invention does not require any auxiliary substances such as resolving reagents or enzymes.

Other objects of the present invention and advantageous features thereof will become apparent as the description proceeds.

The present invention is based on the principle that when the supersaturated aqueous or aqueous-alcoholic solution of ammonium N-acyl-DL-tryptophanate is seeded by enantiomorphic ammonium N-acyl-L-, or D-tryptophanate, the seeded enantiomorphic component in said supersaturated solution is selectively precipitated whereas the other enantiomorphic component remains in said solution.

Moreover, when a slight excess of one enantiomorphic component over the other enantiomorphic component is present in said supersaturated solution, the former precipitates spontaneously without any addition of said component. For instance, a small quantity of one of the enantiomorphic components being dissolved in a warm solution of the racemic mixture and the thus resulting solution being thereafter cooled, a larger quantity of said enantiomorphic component than has been originally dissolved crystallizes out.

Neither DL-tryptophan itself nor N-acyl-DL-tryptophan has such a special property, and the discovery of the nature of said ammonium N-acyl-tryptophanate relates closely to a characteristic feature of the present invention.

According to the present invention, the form of N-acyl-tryptophan is in its ammonium salt, of which any lower alkanoyl derivatives can be used. However, the most advantageously used acyl derivative is N-acetyl tryptophan because of economic reasons, but N-formyl and N-propionyl tryptophans are, however, also usable. For the same reason, the most preferable solvents are water and water-alcohol, although other solvents are applicable.

The process according to the present invention consists of preparing a warm solution of ammonium N-acyl-DL-tryptophanate or said solution containing an excess of one enantiomorph of said salt. The temperature is selected from a range between room temperature and boiling point of said solution for dissolving said ammonium salt. To said solution on cooling, a small amount, preferably more than 0.1% by weight of said solution, of one of the enantiomorphic components is seeded, causing crystallization of the enantiomorphic component. The precipitated crystals which consist substantially of said enantiomorphic component are then separated from the solution, by filtration, centrifugation, or any other means of separating solid substances from liquids.

Seeding of one of the enantiomorphic components to insure the precipitation, which is not essential while said component is present in excess over the other in said solution as solute, is advisable at a temperature between just below the saturation point and below 30° C. of said point. One may, of course, operate at other temperatures.

The mother liquor obtained after separation of the crystalline enantiomorphic component may be utilized for separating the optical antipode of said enantiomorphic component. For this purpose, said mother liquor needs only to be again heated to the desired temperature, whereupon a quantity of racemic ammonium N-acyl-DL-tryptophanate is added to and dissolved in said warm mother liquor. On cooling said replenished solution, with or without addition of the optical antipode of the previously precipitated enantiomorphic component, said component is precipitated and removed in crystalline form.

After separation of said precipitated optical antipode, heating of the mother liquor and addition of corresponding amount of racemic ammonium N-acyl-DL-tryptophanate bring the arm mother liquor to about the same composition as in the beginning of the procedure. On cooling, again, said first precipitated optically active component is precipitated. On repeating these procedures, alternately, both of the optical enantiomorphs of ammonium N-acyl tryptophanate are obtained separately. Thus, direct resolution of given amounts of racemic N-acyl-DL-tryptophan in its ammonium salt can be effected.

The ammonium N-acyl-L-tryptophanate obtained according to the process of the present invention is used for the production of L-tryptophan by utilizing known methods. The ammonium N-acyl-D-tryptophanate is again returned to the resolution process after the racemization by known methods.

The following examples serve to illustrate the invention without, however, limiting the scope of this invention.

*Example 1*

N-acetyl-DL-tryptophan (142.1 g.) was dissolved in 425 ml. of water containing 10 g. of ammonia at the temperature of 85° C. The resulted solution was allowed to cool to room temperature with stirring, and crystallized ammonium N-acetyl-DL-tryptophanate was filtered off, while the filtrate was evaporated to dryness in vacuo and gave another crop of ammonium salt. Total yield was 151.1 g.

The ammonium N-acetyl-DL-tryptophanate (45.8 g.) was dissolved in 250 ml. of water at 60° C. The solution was cooled to 48° C. and 1 g. of ammonium N-acetyl-L-tryptophanate was added to this solution as seed crystals. The mixture was cooled gradually to 20° C. in 75 minutes with stirring and crystallized ammonium N-acetyl-L-tryptophanate was filtered. The filtered crystals were washed once with 15 ml. of 95% ethanol and dried in vacuo. Yield: 10.8 g., $[\alpha]_D^{22}$: +25.0° (c.=4, water).

Example 2

N-acetyl-DL-tryptophan (63.5 g.) was dissolved in 250 ml. of water containing 5 g. of ammonia above 75° C. The solution was cooled to 55° C. and 0.5 g. of ammonium N-acetyl-D-tryptophanate was added to this solution. The mixture was cooled gradually to 48° C. in 17 minutes with stirring and precipitated crystals were filtered and dried. Yield: 11.2 g., $[\alpha]_D^{22}$: −24.8° (c.=4, water).

Example 3

A mixture of 22.7 g. of ammonium N-acetyl-DL-tryptophanate, 2.7 g. of ammonium N-acetyl-D-tryptophanate and 100 ml. of water in a flesk was heated to complete solution. The solution was cooled to 32° C. with stirring and scratched to induce crystallization. Stirring was continued at that temperature and precipitated ammonium N-acetyl-D-tryptophanate was filtered off at 3.5 minutes after crystallization had induced. The crystal was dried in vacuo yielding 5.35 g., $[\alpha]_D^{22}$: −23.2° (c.=4, water).

Example 4

A solution of 135 g. of ammonium N-acetyl-DL-tryptophanate in 587 ml. of water at 80° C. was cooled to 55° C. and to this solution were added 2 g. of ammonium N-acetyl-L-tryptophanate as seed crystals. The mixture was cooled gradually to 41.5° C. in 40 minutes and kept at that temperature for 10 minutes further with stirring. The precipitated crystals were filtered off, washed with 30 ml. of 95% ethanol and dried in vacuo, yielding 21.7 g. of ammonium N-acetyl-L-tryptophanate; $[\alpha]_D^{22}$: +25.5° (c.=4, water).

To the mother liquor were added 36 g. of ammonium N-acetyl-DL-tryptophanate and the mixture was heated to complete solution. The solution was cooled to 64° C. and 0.5 g. of ammonium N-acetyl-D-tryptophanate was added thereto as seed crystals. The mixture was cooled gradually to 41.5° C. in 75 minutes and kept at that temperature for 15 minutes further with stirring. The precipitated crystals were filtered off, washed with 30 ml. of 95% ethanol and dried in vacuo, yielding 34 g. of ammonium N-acetyl-L-tryptophanate; $[\alpha]_D^{22}$: −25.8° (c.=4, water).

Repetition of the above mentioned procedure utilizing the mother liquor, 36 g. of ammonium N-acetyl-DL-tryptophanate and 0.5 g. of ammonium N-acetyl-L-tryptophanate gave 32 g. of the latter; $[\alpha]_D^{22}$: +25.3° (c.=4, water).

Ammonium N-acetyl-L-tryptophanate (18 g.) obtained at first as described in this example was recrystallized from 100 ml. of water. Ten grams of crystals were obtained, having an optical rotation of $[\alpha]_D^{22}$: +26.6° (c.=4, water) which did not alter by further recrystallization. The present ammonium N-acetyl-L-tryptophanate, ammonium N-acetyl-D-tryptophanate and ammonium N-acetyl-DL-tryptophanate are new compounds, which are colorless fine needles having decomposition points of 199.2° C., 199.2° C. and 193.0° C., respectively. Ammonium N-formyl-tryptophanates and ammonium N-propionyltryptophanates in the following examples are also new compounds.

Example 5

Ammonium N-formyl-DL-tryptophanate (5.4 g.) was dissolved in 15 ml. of 82% ethanol at 55° C. The alcoholic solution was cooled to 30° C. and 0.1 g. of ammonium N-formyl-L-tryptophanate was added to this solution as seed crystals with stirring. After 10 minutes of the addition, the precipitated crystals were filtered off and washed with a small amount of 95% cold ethanol. The washed crystals were died in vacuo, yielding 0.85 g. of ammonium N-formyl-L-tryptophanate; $[\alpha]_D^{22}$: +36.9° (c.=1, water).

Example 6

Ammonium N-propionyl-DL-tryptophanate (8.3 g.) was dissolved in 100 ml. of water at 73° C. The solution was cooled to 54° C. and 0.5 g. of ammonium N-propionyl-L-tryptophanate was added to this solution as seed crystals with stirring. The mixture was cooled gradually to 45° C. in 45 minutes and the precipitated crystals were filtered off and washed with 95% ethanol. The washed crystals were dried in vacuo, yielding 1.5 g. of ammonium N-propionyl-L-tryptophanate; $[\alpha]_D^{22}$: +28.1° (c.=2, water).

What we claim is:

1. A process for resolving ammonium N-acyl-DL-tryptophanate into optically active components thereof, said process comprising: cooling a solution constituted by ammonium N-acyl-DL-tryptophanate in a solvent selected from the group consisting of water, aqueous methanol, and aqueous ethanol; to obtain supersaturation of said solution, said acyl being selected from the group consisting of formyl, acetyl and propionyl, adding crystals of one optically active component of the enantiomorphs as a seed crystal into the supersaturated solution at a temperature between about below saturation point and below 30° C. of said point, permitting the crystallization of the seeded enantiomorph and separating the thusly formed crystals from the solution.

2. A process as claimed in claim 1 wherein said solution contains more than one optically active component of the amonium salt.

3. A process as set forth in claim 1, wherein further crystallization is effected by further cooling.

4. A process for resolving amonium N-acyl-DL-tryptophanate into otpically active components thereof, said process comprising: cooling a solution containing both ammonium N-acyl-DL-tryptophanate and one optically active component of the enantiomorphs in a solvent selected from the group consisting of water, aqueous methanol and aqueous ethanol; to obtain supersaturation of the solution, said acyl being selected from the group consisting of formyl, acetyl, and propionyl, permitting crystallization of the crystals of said one enantiomorph in the same form in said solution and separating the crystallized crystals from the solution.

5. A process as set forth in claim 4, wherein further crystallization and growth of the crystals is effected by further cooling.

References Cited in the file of this patent

Gilman: Organic Chemistry, volume 1, pages 187–200 (1938).

Amiard: Bulletin Soc. Chim., France, volume 23, page 447 (1956).

Finar: Organic Chemistry, volume 2, pages 60–62 (1959).